(No Model.)
C. R. MEAD.
LATHE CHUCK.
No. 321,740. Patented July 7, 1885.
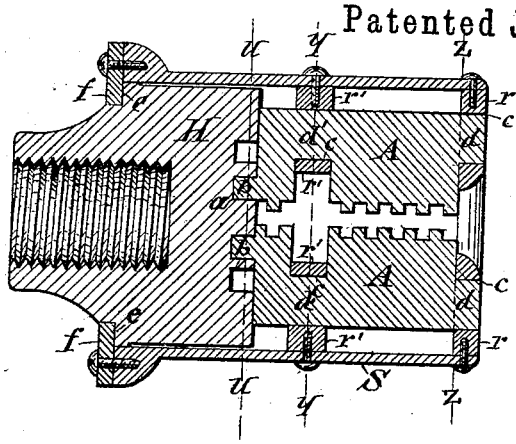
FIG-I-
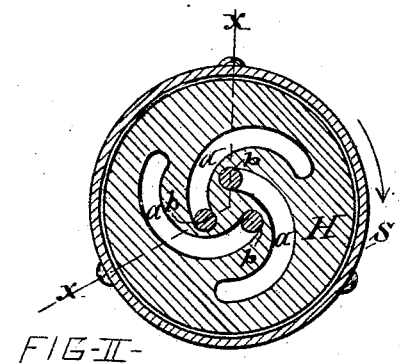
FIG-II-
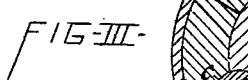
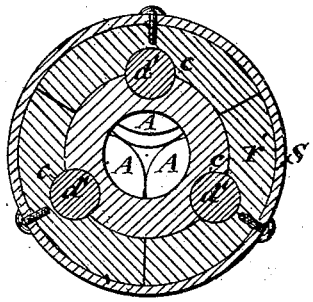
FIG-III-
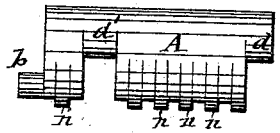
FIG-VII-
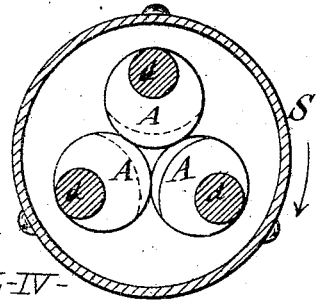
FIG-IV-
FIG-VI-
FIG-V-
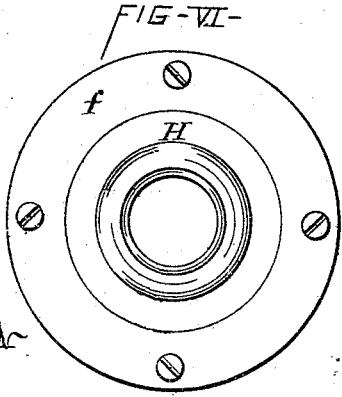
WITNESSES
C. Bendixon
Geo. E. Raymond
INVENTOR
Charles R. Mead
per Duell, Laass & Hey
his Attys

UNITED STATES PATENT OFFICE.

CHARLES R. MEAD, OF COMMUNITY, NEW YORK.

LATHE-CHUCK.

SPECIFICATION forming part of Letters Patent No. 321,740, dated July 7, 1885.

Application filed April 13, 1885. (No model.)

*To all whom it may concern:*

Be it known that I, CHARLES R. MEAD, of Community, in the county of Madison, in the State of New York, have invented new and useful Improvements in Chucks, of which the following, taken in connection with the accompanying drawings, is a full, clear, and exact description.

This invention relates to the class of chucks which are designated "universal chucks," and in which the jaws are made to synchronously move toward or from the center of the chuck for holding work or tools of different sizes.

My invention consists in a novel construction and combination of the components of the chuck, having jaws pivoted eccentrically in relation to their gripping-faces, so as to carry the latter toward and from the center of the chuck by the turning of said jaws, all as hereinafter more fully described, and set forth in the claims.

In the annexed drawings, Figure I is a longitudinal section of my improved chuck, taken on line $x$ $x$, Fig. II. Figs. II, III, and IV are transverse sections taken, respectively, on lines $u$ $u$, $y$ $y$, and $z$ $z$, Fig. I. Fig. V is a face view of the chuck; Fig. VI, a rear end view of the same, and Fig. VII a detached view of one of the jaws.

Similar letters of reference indicate corresponding parts.

H denotes the chuck-head, consisting of a cylindrical body adapted to be secured to the live-spindle of a lathe in any suitable and well-known manner. Upon the head is mounted a sleeve, S, which is fitted loosely thereon, so as to allow it to be rotated about the head H, and is confined longitudinally, so as to prevent its movement endwise, by an annular band, $f$, attached to the rear end of the sleeve, and entering a circumferential rabbet, $e$, in the back of the head H, which band prevents the movement of the sleeve outward from the chuck. The movement in the opposite direction is prevented by the jaws and their supporting-rings hereinafter described.

A A A represent the jaws of the chuck. These jaws are of cylindrical form, and provided with transverse ribs $n$ $n$, constituting segmental gripping-faces, and are also provided with journals $d$ and $d'$, one of which projects from one end of the jaw, and the other is near the opposite end of the same, said journals being arranged eccentric in relation to the gripping-faces of the jaw.

To the interior of the outer end of the sleeve S is detachably secured a ring, $r$, provided with journal-bearings $c$ $c$ $c$ for the reception of the end journals, $d$ $d$ $d$, of the jaws. Another ring, $r'$, provided with corresponding journal-bearings, $c$ $c$ $c$, is arranged inside of the sleeve S in such a position as to receive the journals $d'$ $d'$ $d'$ of the jaws A A A. In order to admit of applying this ring $r'$ to the jaws, and of removing it from same when required for repairing or renewing either of said parts, I form said ring of two detachable concentric annular sections arranged one around the other, and each provided with a portion of the respective journal-bearings $c$ $c$ $c$. The outer of said sections is subdivided transversely, and detachably secured to the interior of the sleeve, as represented in Fig. 3 of the drawings. The abutment of the ends of the jaws against the face of the head and inner side of the outer ring, $r$, together with the band $f$, engaging the rabbet $e$ in the back of the head H, effectually prevents the sleeve S from moving longitudinally. The face of the chuck-head H is provided with segmental cam-grooves $a$ $a$ $a$, described from centers equidistantly apart and equidistantly from the center of the head H, as shown in Fig. 2 of the drawings. On the ends of the jaws adjacent to the face of the head H are lugs $b$ $b$ $b$, which extend into cam-grooves $a$ $a$ $a$. Said lugs are arranged near the gripping-faces of the jaw, and thus farthest from the axis of the journals $d$ $d'$.

The sleeve S, with the rings $r$ $r'$, constitute a rotary jaw-carrier, which has its axis parallel with that of the chuck-head, and by turning said jaw-carrier in the direction indicated by arrows in Figs. 2 and 4 of the drawings the travel of the lugs $b$ $b$ in the cam-grooves $a$ $a$ causes the jaws A A to turn so as to carry their gripping-faces synchronously toward the axial center of the chuck, and a reverse movement of the described jaw-carrier causes the jaws to move outward, the chuck having thus a universal adjustment to hold work or tools of different sizes.

I do not limit my invention to the employment of the cam-grooves $a\ a$ and lugs $b\ b$ in connection with the pivoted jaws, inasmuch as worm-gears, spiral gears, and other adjusting devices used on other chucks are also applicable to this chuck.

What I claim as my invention is—

1. The combination, with the chuck-head, of a sleeve arranged rotatively about said head and parallel with the axis thereof, journal-bearings on said sleeve eccentric to the axis of the chuck, and jaws pivoted in said bearings eccentrically in relation to the gripping-faces of the jaws, substantially as described and shown.

2. The combination, with the chuck-head provided with segmental cam-grooves $a\ a\ a$ in the face thereof, of the sleeve S, arranged rotatively and confined longitudinally on the chuck-head, journal-bearings on the sleeve, and jaws pivoted in said bearings eccentrically in relation to their gripping-faces, and provided with lugs $b\ b\ b$, extending into the grooves $a\ a\ a$, substantially as described and shown.

3. The combination, with the head H, of the rotary sleeve S, projecting from said head, journal-bearings attached to the interior of the projecting portions of the sleeve and equidistant from the center of the chuck, and jaws pivoted in said bearings eccentrically in relation to the gripping-faces of the jaws, substantially as described and shown.

4. In combination with the chuck-head H and the rotary sleeve S, projecting from said head and confined longitudinally thereon, the rings $r\ r'$, detachably connected to the interior of the sleeve, and provided with the journal-bearings $c\ c\ c$, and the jaws A A A, confined between the chuck-head and outer ring, $r$, and having eccentric journals $d\ d'$ in the bearings $c\ c\ c$, substantially as described and shown.

5. In combination with the chuck-head H, rotary sleeve S, and jaws A A, having eccentric journals $d\ d'$, the ring $r$, secured to the outer end of the sleeve and provided with the journal-bearings $c\ c$, and the ring $r'$, composed of two detachable concentric annular sections arranged one surrounding the other, each provided with a portion of the respective journal-bearings $c\ c$, and the outer section being subdivided transversely and detachably connected to the sleeve, substantially as described and shown.

6. The improved chuck composed of the cylindrical head H, provided with the rabbet $e$ and segmental cam-grooves $a\ a\ a$, the sleeve S, mounted loosely on said head and projecting therefrom, the band $f$ on the sleeve, entering the rabbet $e$, the ring $r$ secured to the outer end of the sleeve, and provided with journal-bearings $c\ c$, the ring $r'$, composed of detachable sections detachably connected to the interior of the sleeve, and provided with journal-bearings $c\ c$, and the jaws A A, provided with journals $d\ d'$, eccentric in relation to the gripping-faces of the jaws, and lugs $b\ b$ on the inner end of the jaws, extending into the grooves $a\ a$, all constructed and combined substantially in the manner specified and shown.

In testimony whereof I have hereunto signed my name and affixed my seal, in the presence of two attesting witnesses, at Oneida, in the county of Madison, in the State of New York, this 9th day of April, 1885.

CHARLES R. MEAD. [L. S.]

Witnesses:
A. B. FRENCH,
Z. F. WHITE.